United States Patent
Catchpole et al.

(10) Patent No.: US 8,873,214 B2
(45) Date of Patent: Oct. 28, 2014

(54) WIND TURBINE LIGHTNING PROTECTION AND MONITORING SYSTEMS

(75) Inventors: Jonathan Catchpole, West Hanney Oxfordshire (GB); Robert Alexander Blanch, Swindon Wiltshire (GB)

(73) Assignee: Tyco Electronics UK Limited, Swindon, Wiltshire (GB)

( * ) Notice: Subject to any disclaimer, the term of this patent is extended or adjusted under 35 U.S.C. 154(b) by 460 days.

(21) Appl. No.: 13/264,880

(22) PCT Filed: Apr. 13, 2010
(Under 37 CFR 1.47)

(86) PCT No.: PCT/EP2010/054806
§ 371 (c)(1),
(2), (4) Date: Oct. 17, 2011

(87) PCT Pub. No.: WO2010/119027
PCT Pub. Date: Oct. 21, 2010

(65) Prior Publication Data
US 2013/0049734 A1    Feb. 28, 2013

(30) Foreign Application Priority Data
Apr. 17, 2009 (GB) .................................. 0906641.6

(51) Int. Cl.
| H01H 47/00 | (2006.01) |
| H05F 3/00 | (2006.01) |
| H05F 3/02 | (2006.01) |
| H02G 13/00 | (2006.01) |
| F03D 11/00 | (2006.01) |

(52) U.S. Cl.
CPC ............... *H02G 13/00* (2013.01); *Y02E 10/722* (2013.01); *Y02E 10/726* (2013.01); *F03D 11/0033* (2013.01); *F05B 2260/80* (2013.01); *Y02E 10/725* (2013.01)
USPC ........................................................ 361/220

(58) Field of Classification Search
CPC ............ H01H 83/10; H02H 1/04; H02H 3/22
USPC ........................................................ 361/220
See application file for complete search history.

(56) References Cited

U.S. PATENT DOCUMENTS 6,407,900 B1 *   6/2002   Shirakawa et al. ........... 361/117
7,236,341 B1 *   6/2007   Carpenter, Jr. ................ 361/117
(Continued)

FOREIGN PATENT DOCUMENTS

| DE | 4436197 A1 | 4/1996 |
| EP | 1568883 A2 | 8/2005 |
| WO | WO 2004/044419 A1 | 5/2004 |

OTHER PUBLICATIONS

International Search Report and Written Opinion issued by the European Patent Office, dated Apr. 14, 2011, for related International Application No. PCT/EP2010/054806; 16 pages.

(Continued)

*Primary Examiner* — Dharti Patel
(74) *Attorney, Agent, or Firm* — Faegre Baker Daniels LLP

(57) ABSTRACT

A wind turbine hub (8) and nacelle (4) assembly including lightning conducting means (26, 30, 32, 40) for conducting lightning between the hub (8) and the nacelle (4), the hub (8) being mounted for rotation relative to the nacelle (4) and being adapted to support turbine blades, the hub (8) including a hub conductor (26) for connection to a turbine blade supported by the hub (8), the lightning conducting means including a conductive track (40) and a terminal (30, 32) which confront and are displaceable relative to each other, one of the conductive track (40) and the terminal (30, 32) being mounted on the hub (8) and being electrically connected to the hub conductor (26) and the other of the conductive track (40) and the terminal (30, 32) being mounted on the nacelle (4), the terminal (30, 32) including a terminal main body (30) which is spaced from the conductive track (40) and a sacrificial conductive terminal extension (32) extending from the terminal main body (30) towards the track (40).

15 Claims, 3 Drawing Sheets

(56) References Cited

U.S. PATENT DOCUMENTS

| | | | |
|---|---|---|---|
| 8,081,414 B2* | 12/2011 | Llorente Gonzalez | 361/220 |
| 8,456,790 B2* | 6/2013 | Tanaka et al. | 361/117 |
| 8,643,998 B2* | 2/2014 | Sanchez | 361/225 |
| 2003/0170122 A1 | 9/2003 | Wobben | |
| 2007/0114797 A1 | 5/2007 | Krug et al. | |
| 2007/0115607 A1* | 5/2007 | Rizk et al. | 361/220 |
| 2008/0048453 A1 | 2/2008 | Amick | |
| 2008/0270052 A1* | 10/2008 | Bernus | 702/65 |
| 2010/0119370 A1* | 5/2010 | Myhr | 416/39 |

OTHER PUBLICATIONS

Search Report issued by the UK Intellectual Property Office, dated Aug. 13, 2009, for Priority Application No. GB 0906641.6; 3 pages.

International Preliminary Report on Patentability, issued by the International Bureau of WIPO, Geneva, Switzerland, dated Oct. 18, 2011 for International Application No. PCT/EP2010/054806; 9 pages.

* cited by examiner

WIND TURBINE LIGHTNING PROTECTION AND MONITORING SYSTEMS

The present invention relates to a wind turbine lightning strike protection system, a method of conducting lightning strike electricity to ground and a monitoring system for monitoring lightning strikes on a wind turbine.

Wind turbines with lightning conducting systems for conducting lightning electricity to ground are known. An example of such a wind turbine is disclosed in patent US 2007/0114797-A1 in which a rotor hub supporting a plurality of wind turbine blades is provided with a slip ring for conducting lightning strike electricity to ground. Spark gap members are mounted on a rotor supporting nacelle so as to each be positioned with an end spaced from the slip ring by a small spark gap. Lightning strike electricity is conducted to the slip ring then across the spark gap to ground. The use of such spark gaps for conducting lightning strike electricity away from the rotor provides a high impedance connection and is accordingly not efficient. Furthermore, due to component tolerances, it is difficult to maintain the spark gaps so that they are sufficiently small. If the spark gaps are too large effective grounding will not occur.

An object of the invention is to overcome at least one of the disadvantages associated with the prior art.

According to a first aspect of the invention there is provided a wind turbine hub and nacelle assembly including lightning conducting means for conducting lightning between the hub and the nacelle, the hub being mounted for rotation relative to the nacelle and being adapted to support turbine blades, the hub including a hub conductor for connection to a turbine blade supported by the hub, the lightning conducting means including a conductive track and a terminal which confront and are displaceable relative to each other, one of the conductive track and the terminal being mounted on the hub and being electrically connected to the hub conductor and the other of the conductive track and the terminal being mounted on the nacelle, the terminal including a terminal main body which is spaced from the conductive track and a sacrificial conductive terminal extension extending from the terminal main body towards the track. By providing the terminal with a sacrificial terminal extension, the terminal extension can be worn down by sliding contact with the conductive track until a gap exists between the terminal extension and the conductive track. Due to the manner in which this gap is formed it will be very small. When lightning strike electricity is conducted between the terminal and the conductive track a majority of the terminal extension between the terminal main body and the conductive track will be vaporised and an arc will be formed between the terminal and the conductive track. This arc will in turn generate plasma, creating a conductive path from ionised air which will allow continued conduction of electricity to the conductive track. After such a lightning strike has occurred it will be necessary to replace the sacrificial terminal extension.

In order initiate the arc formation and the consequent plasma formation at the earliest opportunity, preferably the terminal extension extends at least substantially to the track. As mentioned above, when the hub and nacelle are initially installed the terminal extension preferably contacts the conductive track and initial rotation of the hub causes the terminal extension to wear down until a small gap exists between the terminal extension and the conductive track.

Preferably the terminal extension includes plural conductive members situated side-by-side. Such an arrangement will provide plural terminal extension parts which confront the conductive track each with a relatively small cross-sectional area which will increase electric field strength at the ends of these parts. This will in turn increase the potential to ionise air between the terminal extension and the conductive track. Conveniently the terminal extension comprises brush like conducting means and may advantageously comprise a brush composed of a multiplicity of conducting wires.

Preferably a surface of the terminal main body is domed towards the track in order to increase field strength and accordingly the potential to ionise the air between the terminal and the conductive track.

The track may be mounted on the nacelle and the terminal mounted on the hub. With such an arrangement a lightning conductor from each blade can conveniently be separately electrically connected to an individual terminal. Each turbine blade is preferably connected by a lightning conductor to at least one said terminal. It is possible however that each turbine blade is connected to a plurality of said terminals. Such an arrangement would provide advantageous redundancy.

According to a second aspect of the invention there is provided a method of conducting lightning electricity in a wind turbine hub and nacelle assembly including the steps of: (i) providing a wind turbine hub and nacelle assembly according to the first aspect of the invention; (ii) conducting lightning electricity from the hub conductor to the terminal main body then through the terminal extension to the track and then to ground; (iii) vaporising a majority of the terminal extension between the terminal main body and the track as a result of electricity flowing through the terminal extension; (iv) forming a conductive plasma path between the terminal main body and the track; and (v) continuing to conduct electricity between the terminal main body and the track via the plasma path.

According to a third aspect of the invention there is provided a wind turbine lightning strike monitoring system including a rotor supporting plural wind turbine blades each including a lightning conductor and an inductive sensor configured to generating an electrical signal when the respective lightning conductor conducts lightning strike electricity to ground. Due to the extremely high current which flows in a lightning conductor when struck (in the order of 200 kA) sensing the strike by means of an inductive sensor provides a particularly reliable way of effecting such sensing.

Preferably the monitoring system also includes data acquisition means adapted to acquire data relating to which wind turbine blade has been struck by lightning. When the wind turbine is one of plural wind turbines in a so-called wind farm the data acquisition means is preferably also adapted to acquire data relating to which wind turbine has been struck by lightning. With such a system it will be possible to quickly ascertain which sacrificial terminal of which turbine will need to be replaced.

Preferably the system includes a transducer arranged to convert the electrical signal to an optical signal for transmission between the hub and a transmitter supported by a support structure for the hub. Such an arrangement will avoid the need for a slip ring or like electrical connection to accommodate relative movement between the hub and the nacelle to transmit the signal to the transmitter. Such a system means that the signals can be multiplexed through a single optical fibre passing through and out of the hub to a data acquisition system in the nacelle.

Conveniently the monitoring system further includes a SCADA (Supervisory Control And Data Acquisition) system and each inductive sensor comprises an induction loop arranged to transmit a signal to the SCADA system to enable monitoring of which wind turbine blade has been struck by lightning.

The invention will now be described by way of example only with reference to the accompanying drawings in which.

Figure 1:
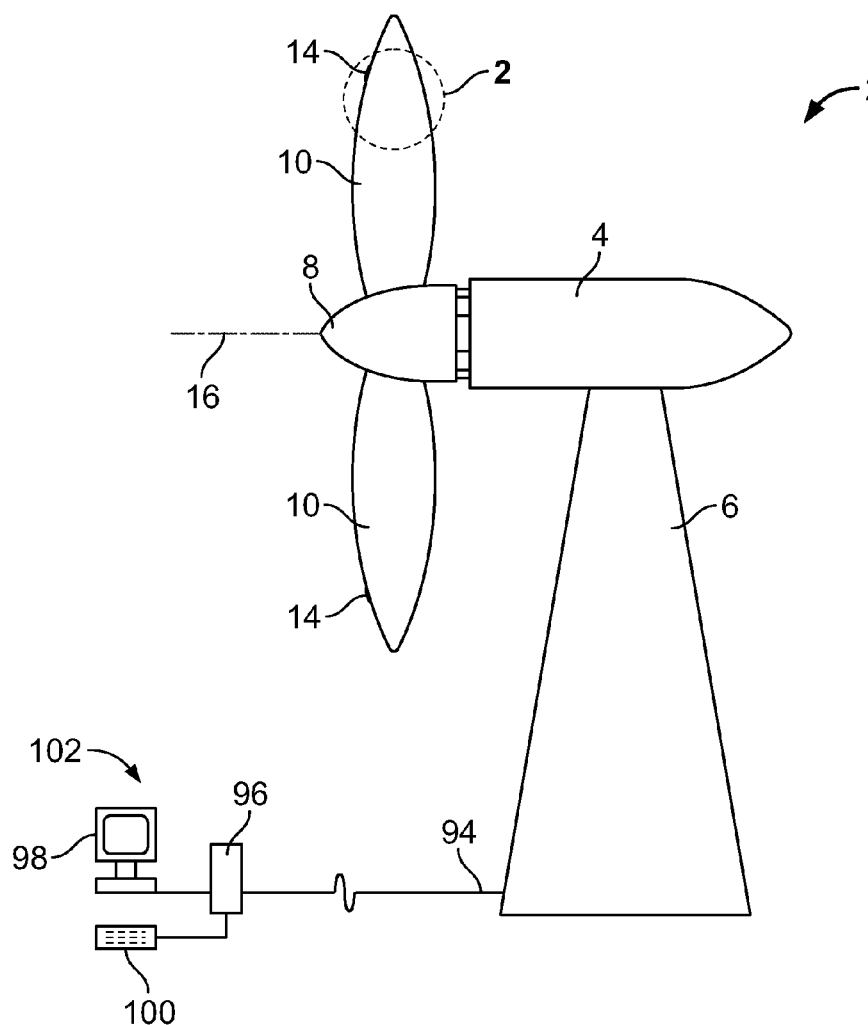
FIG. 1 shows a side view of a wind turbine with a hub and nacelles in accordance with a first embodiment of the invention.
Figure 2:
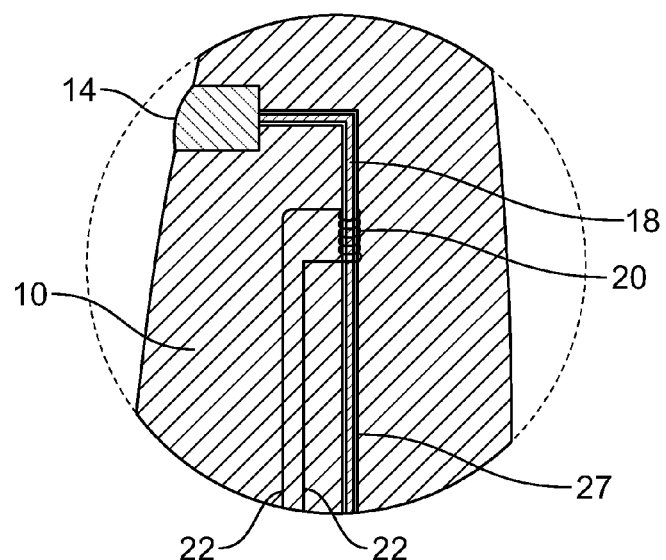
FIG. 2 shows a schematic cross-sectional view through a part, marked A in FIG. 1, of one of the turbine blades of the wind turbine shown in FIG. 1.

FIG. 1 shows a wind turbine 2 including a hub 8 and nacelle 4 assembly in accordance with the invention. The nacelle 4 is supported by a tower 6 and the hub 8 supports two turbine blades 10 for rotation about a rotation axis 16. Each turbine blade includes a domed lightning strike pad 14 positioned exteriorly and close to its end. An enlarged cross-sectional view of the portion of the upper turbine blade 10 marked A in FIG. 1 is illustrated in FIG. 2 which shows that a lightning conductor 18, made of a suitable conducting material such as copper alloy, is connected to an inner part of the pad 14. The lightning conductor 18 extends along the blade 10 to the hub 8 and has an inductive sensor 20, in the form of a coil surrounding a portion of it. Sensor leads 22 from the inductive sensor 20 extend along the blade 10 to the hub 8. The inductive sensor 20 could be located in other positions along the lightning conductor 18, for example in the hub 8. Furthermore the inductive sensor 20 need not surround the lightning conductor 18 as shown but could be positioned adjacent to it provided the inductive sensor was close enough to it to detect a lightning strike passing along the lightning conductor 18.

Figure 3:
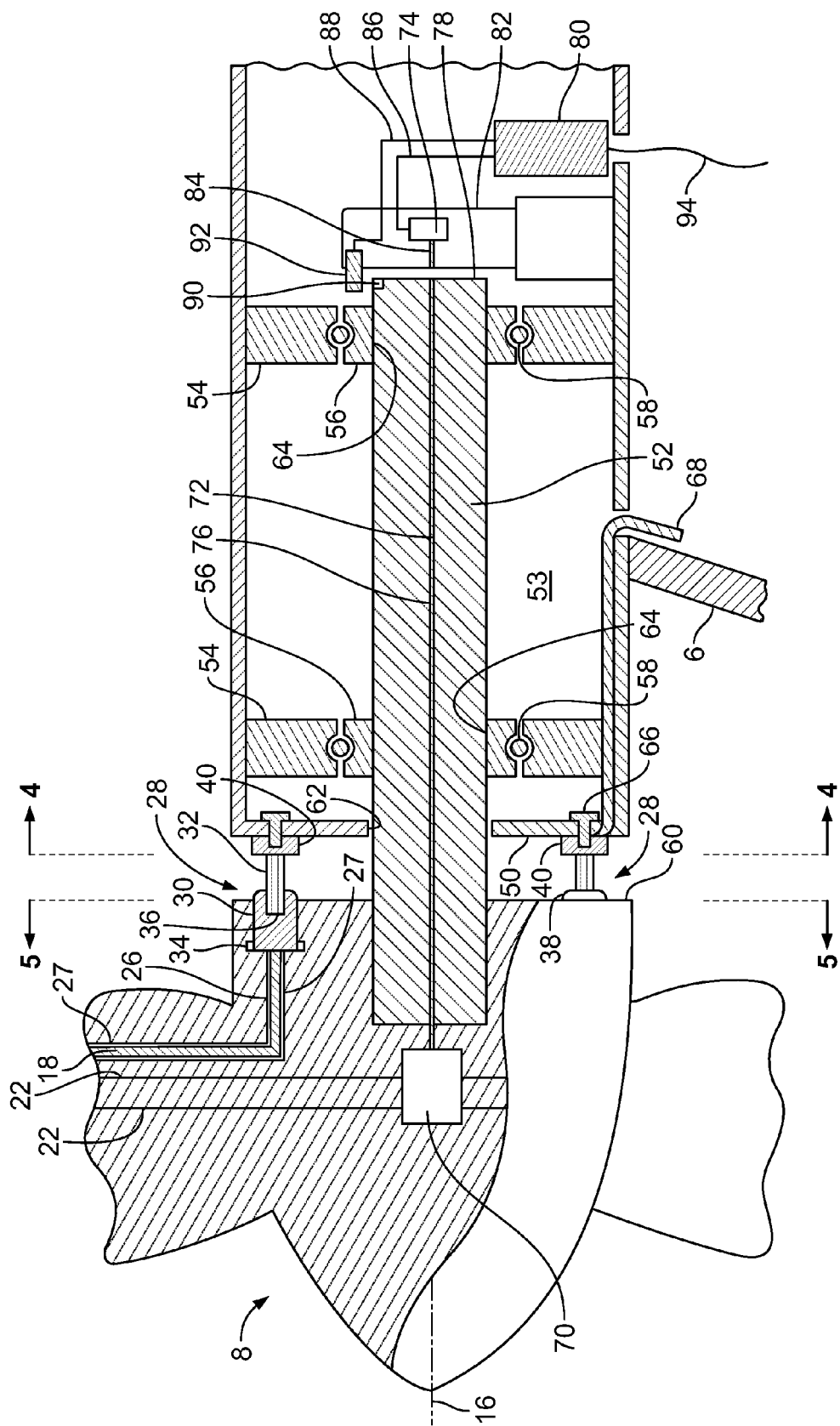
FIG. 3 shows a schematic part cross-sectional view through the hub and nacelle of the wind turbine shown in FIG. 1.

With reference to FIG. 3, the hub 8 contains a hub conductor 26 which is connected to the lightning conductor 18, may also be formed of copper alloy and may constitute an extension of the conductor 18. The hub conductor 26 is also connected to a terminal 28 which projects from the hub 8 towards the nacelle 4. The lightning conductor 18 and the hub conductor 26 are encased in an insulating layer 27. The terminal 28 includes a terminal main body 30, which may be formed of copper alloy, and a sacrificial conductive terminal extension 32. The main body 30 includes a flanged base 34 for securing it in the hub 8. The main body also includes a blind hole 36 in which the terminal extension 32 is secured. A surface 38 of the main body 30 facing an annular conductive track 40 secured to an outer surface of the nacelle 4 is domed. The terminal extension 32 comprises a multiplicity of conductive wires which may be stainless steel wires. The wires are in the form of a brush which extends from the terminal main body 30 substantially to the conductive track 40.

Figure 6:
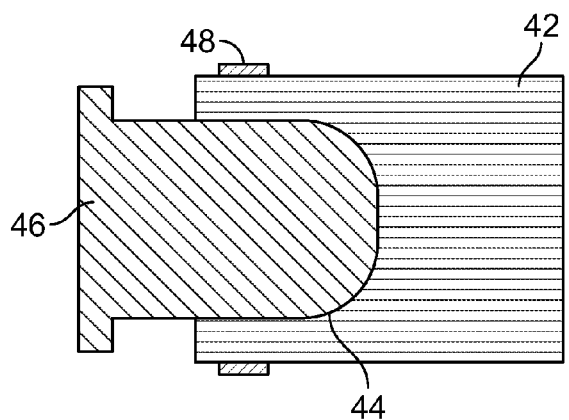
FIG. 6 shows an alternative arrangement for the terminal.

An alternative arrangement for the terminal is shown in FIG. 6. The terminal in FIG. 6 includes a terminal main body 46 with a domed distal end face 44. The terminal main body 46 is surrounded by a multiplicity of wires constituting the terminal extension 42. The wires are surrounded by a clip 48 such as a stainless steel Jubilee clip™ which holds the wires securely around the terminal main body 46.

The hub 8 is supported for rotation by means of a rotor shaft 52 which extends from a rear face 60 of the hub 8 and passes through an aperture 62 in a front face 50 of the nacelle body 24. Inside the nacelle body 24 the rotor shaft 52 is mounted for rotation by means of outer bearing members 54 which engage the nacelle body 24 and inner bearing members each of which has a through passage 64 which receives the rotor shaft 52. A generator chamber 53 is located between the rotor shaft 52 and the nacelle body 24 in which electricity generating means will be located. The electricity generating means has been omitted for the purpose of clarity.

Figure 4:
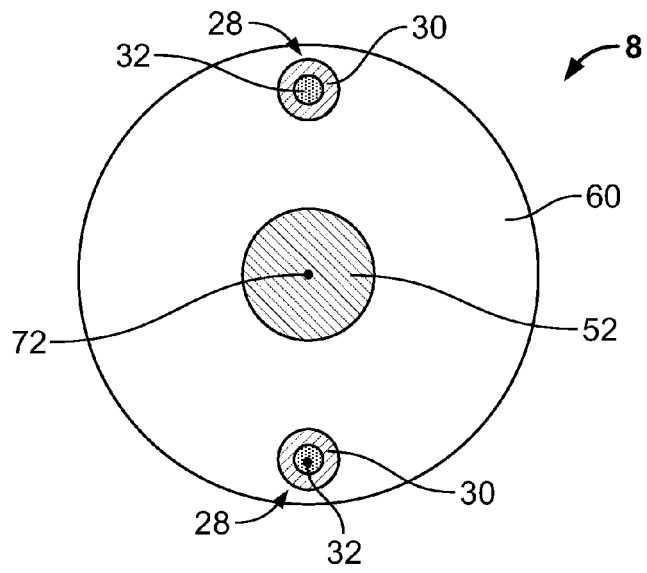
FIG. 4 shows a schematic cross-sectional view of the assembly shown in FIG. 3 on the line 4-4.
Figure 5:
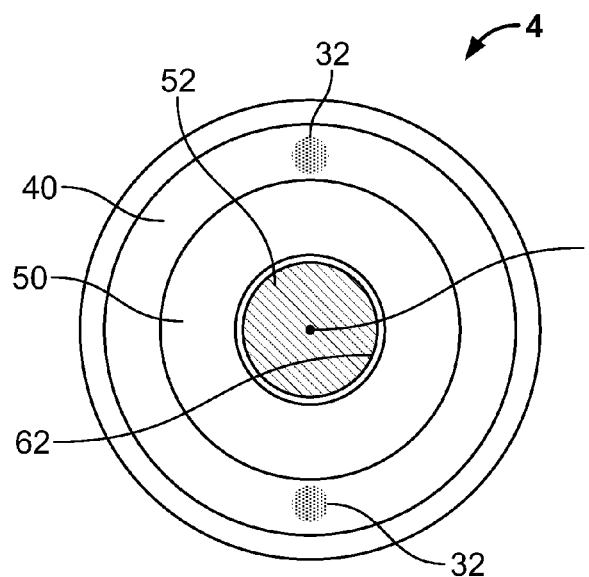
FIG. 5 shows a schematic cross-sectional view of the assembly shown in FIG. 3 on the line 5-5.

The conductive track 40 is annular and secured to the front face 50 of the nacelle body 24, concentrically with respect to the rotation axis 16 and the rotor shaft 52, by means of bolts 66 which engage threaded holes in a rear surface of the track 40. FIG. 5 is a cross-section on the line 5-5 in FIG. 3 and shows the front face 50 of the nacelle body 24 with the conductive track 40 connected thereto. A tower conductor 68 is electrically connected to the conductive track 40 and is routed through the nacelle body 24 and down the tower 6 to ground. FIG. 4 is a cross-section on the line 4-4 in FIG. 3 and shows the rear face 60 of the hub 8 and the terminals 28.

When the hub 8 is initially connected to the nacelle 4 the terminal extensions 32 will be designed to just contact the conductive track 40. As rotation of the hub occurs the terminal extensions 32 will wear down to a point as which a very small gap exists between each terminal extension 32 and the conductive track 40.

In the hub 8 the sensor leads 22 from the two inductive sensors 20 are connected to a transducer 70 which converts electrical signals from the inductive sensors 20 into optical signals which are conveyed by means of an optical fibre 72, which extends along a passageway 76 in the rotor shaft 52. The optical fibre 72 terminates at a rear face 78 of the rotor shaft 52. Signals from the inductive sensors 20 may alternatively be transmitted to a data acquisition system 80 in the nacelle 4 in an alternative manner. For example the signals may remain in electrical form and be conveyed to the nacelle 4 by means of a slip ring which is positioned to surround the rotor shaft 52.

A support 82 is mounted in the nacelle body 24 immediately adjacent to the rear face 78 of the rotor shaft 52. The support 82 supports an optical fibre stub 84 in alignment with the optical fibre 72 in the rotor shaft 52. The fibre stub 84 is connected to a second transducer 74 which converts optical signals received from the first transducer 70 via the optical fibre 72 and the fibre stub 84 into electrical signals which are conveyed by wires 86 to the data acquisition system 80, which may be in the form of a so-called SCADA (Supervisory Control And Data Acquisition) system. A magnet 90 is mounted on the rotor shaft 52 and is arranged to pass a proximity sensor 92 connected to the support 82 each time the rotor shaft rotates. A signal from the proximity sensor 92 is routed to the SCADA system 80 by means of a further wire 88. The SCADA system may also be supplied with further data relating to other characteristics of the wind turbine. A transmission line 94 leads from the SCADA system 80 to a data processing system 102 located remotely from the wind turbine 2 and shown in FIG. 1. The data processing system 102 may include a central processing unit 96 connected to a screen 98 and keyboard 100 for accessing data relating to the wind turbine 2.

When one of the pads 14 is struck by lightning electricity will travel down the associated lightning conductor 18 to the hub conductor 26 and into the terminal main body. Electricity will then flow into the terminal extension 32 and an arc will then be formed between the terminal extension 32 and the conductive track 40. From the conductive track electricity can flow along the tower conductor 68 to ground. At the interface between the terminal extension 32 and the conductive track 40 the terminal extension 32 will vaporise and as this occurs an arc will be drawn between the terminal 28 and the conductive track 40. This arc will generate a conductive plasma path from ionised air which will provide efficient conduction of electricity between the terminal main body 30 and the conductive track. After the lightning strike has occurred it will be necessary to replace the terminal extension 32 that has been consumed.

When a lightning strike occurs conduction of electricity down the lightning conductor 18 causes the inductive sensor 20 associated therewith to produce an electrical signal which is conveyed by means of the sensor leads 22 to the first transducer 70 where the electrical signal is converted into an optical signal and conveyed along the optical fibre 72 and the fibre stub 84 to the second transducer 74 where it is converted back into an electrical signal. The electrical signal from the second transducer 74 is routed to the SCADA system for onward transmission via the transmission line 94 to the data processing system 102 which constitutes a human interface enabling an operator to monitor which of a possible plurality of wind turbines has been struck by lightning and in particular which turbine blade has been struck.

While a particular embodiment of the invention has been described, it will be appreciated that modifications thereto may be made without departing from the scope of the invention as defined by the claims. The wind turbine may include three or more blades. The track could be mounted on the hub and one or more terminals could be mounted on the nacelle. All lightning conductors could be connected to a single hub mounted terminal or alternatively each lightning conductor could be connected to two, three or more such terminals. The sacrificial terminal extension could be in the form of a plurality of rods which may have pointed distal ends or could be in the form of a solid member made of a material which would vaporise when it conducts lightning strike electricity therethrough. The inductive sensors could be situated in hub portions of lightning conductors leading from the turbine blades.

The invention claimed is:

1. Wind turbine hub and nacelle assembly including a lightning conducting means for conducting lightning between the hub and the nacelle, the hub being mounted for rotation relative to the nacelle and being adapted to support turbine blades, the hub including a hub conductor for connection to a turbine blade supported by the hub, the lightning conducting means including a conductive track and a terminal which confront and are displaceable relative to each other, one of the conductive track and the terminal being mounted on the hub and being electrically connected to the hub conductor and the other of the conductive track and the terminal being mounted on the nacelle, the terminal including a terminal main body which is spaced from the conductive track and a sacrificial conductive terminal extension extending from the terminal main body towards the track.

2. The assembly of claim 1 wherein the terminal extension extends at least substantially to the track.

3. The assembly of claim 1 wherein the terminal extension includes plural conductive members situated side-by-side.

4. The assembly of claim 1 wherein the terminal extension comprises brush like conducting means.

5. The assembly of claim 4 wherein the terminal extension comprises a brush composed of a multiplicity of conducting wires.

6. The assembly of claim 1 wherein a surface of the terminal main body is domed towards the track.

7. The assembly of claim 1 wherein the track is mounted on the nacelle and the terminal is mounted on the hub.

8. The assembly of claim 7 in combination with turbine blades supported by the hub, wherein each turbine blade is connected by a lightning conductor to at least one said terminal.

9. The hub, nacelle and turbine blade combination of claim 8 wherein each turbine blade is connected by lightning conducting means to plural said terminals.

10. A method of conducting lightning electricity in a wind turbine hub and nacelle assembly including the steps of: (i) providing a wind turbine hub and nacelle assembly according to claim 1; (ii) conducting lightning electricity from the hub conductor to the terminal main body then through the terminal extension to the track and then to ground; (iii) vaporising a majority of the terminal extension between the terminal main body and the track as a result of electricity flowing through the terminal extension; (iv) forming a conductive plasma path between the terminal main body and the track; and (v) continuing to conduct electricity between the terminal main body and the track via the plasma path.

11. A wind turbine lightning strike monitoring system including a rotor supporting plural wind turbine blades each including a lightning conductor and an inductive sensor configured to generate an electrical signal when the respective lightning conductor conducts lightning strike electricity to ground, and further comprising data acquisition means adapted to acquire data relating to which wind turbine blade has been struck by lightning.

12. The monitoring system of claim 11 in combination with a wind turbine including a hub and nacelle assembly.

13. The monitoring system of claim 12, wherein the hub and nacelle assembly comprise a lightning conducting means for conducting lightning between the hub and the nacelle, the hub being mounted for rotation relative to the nacelle and being adapted to support turbine blades, the hub including a hub conductor for connection to a turbine blade supported by the hub, the lightning conducting means including a conductive track and a terminal which confront and are displaceable relative to each other, one of the conductive track and the terminal being mounted on the hub and being electrically connected to the hub conductor and the other of the conductive track and the terminal being mounted on the nacelle, the terminal including a terminal main body which is spaced from the conductive track and a sacrificial conductive terminal extension extending from the terminal main body towards the track.

14. A wind turbine lightning strike monitoring system including a rotor supporting plural wind turbine blades each including a lightning conductor and an inductive sensor configured to generate an electrical signal when the respective lightning conductor conducts lightning strike electricity to ground, and further comprising a transducer arranged to convert the electrical signal to an optical signal for transmission between the hub and a transmitter supported by a support structure for the hub.

15. A wind turbine lightning strike monitoring system including a rotor supporting plural wind turbine blades each including a lightning conductor and an inductive sensor configured to generate an electrical signal when the respective lightning conductor conducts lightning strike electricity to ground, and further comprising a SCADA (Supervisory Control And Data Acquisition) system and each inductive sensor comprises an induction loop arranged to transmit a signal to the SCADA system to enable monitoring of which wind turbine blade has been struck by lightning.

* * * * *